United States Patent
Kumazawa et al.

(10) Patent No.: US 10,090,077 B2
(45) Date of Patent: Oct. 2, 2018

(54) RESIN COMPOSITION AND MOLDED ARTICLE CONTAINING THE SAME

(75) Inventors: Hiroe Kumazawa, Kanagawa (JP); Hiroki Yamasaki, Ehime (JP); Hideaki Suzuki, Ibaraki (JP); Kozo Tamura, Ibaraki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 13/979,981

(22) PCT Filed: Jan. 12, 2012

(86) PCT No.: PCT/JP2012/000162
§ 371 (c)(1),
(2), (4) Date: Jul. 16, 2013

(87) PCT Pub. No.: WO2012/098840
PCT Pub. Date: Jul. 26, 2012

(65) Prior Publication Data
US 2013/0295308 A1    Nov. 7, 2013

(30) Foreign Application Priority Data

Jan. 17, 2011  (JP) ................................. 2011-007307
Jun. 3, 2011   (JP) ................................. 2011-125742

(51) Int. Cl.
| | |
|---|---|
| H01B 1/24 | (2006.01) |
| C08L 77/06 | (2006.01) |
| C08G 69/26 | (2006.01) |
| C08K 3/04 | (2006.01) |
| C08K 7/24 | (2006.01) |
| C08L 51/06 | (2006.01) |
| F16L 9/12 | (2006.01) |

(52) U.S. Cl.
CPC ............. *H01B 1/24* (2013.01); *C08G 69/265* (2013.01); *C08K 3/04* (2013.01); *C08K 3/041* (2017.05); *C08K 7/24* (2013.01); *C08L 51/06* (2013.01); *C08L 77/06* (2013.01); *C08K 2201/001* (2013.01); *C08K 2201/011* (2013.01); *F16L 9/12* (2013.01); *F16L 9/125* (2013.01); *Y10T 428/139* (2015.01)

(58) Field of Classification Search
CPC ........... H01B 1/24; C08L 77/00; C08L 77/06; C08G 69/26
USPC .......... 428/36.9, 36.91, 36.92; 528/332, 335, 528/338, 339
See application file for complete search history.

(56) References Cited

U.S. PATENT DOCUMENTS

| | | | |
|---|---|---|---|
| 6,602,565 B1 * | 8/2003 | Katayama et al. ......... 428/35.7 |
| 6,730,378 B2 | 5/2004 | Matsuoka et al. | |
| 6,846,868 B2 | 1/2005 | Oka et al. | |
| 7,259,196 B2 | 8/2007 | Suzuki et al. | |
| 7,544,313 B2 | 6/2009 | Taniguchi et al. | |
| 2002/0172786 A1 | 11/2002 | Matsuoka et al. | |
| 2003/0050376 A1 * | 3/2003 | Oka et al. ...................... 524/413 |
| 2003/0096070 A1 | 5/2003 | Matsuoka et al. | |
| 2008/0274355 A1 * | 11/2008 | Hewel ........................... 428/402 |
| 2009/0098325 A1 | 4/2009 | Uchida et al. | |
| 2009/0309073 A1 | 12/2009 | Takagi et al. | |
| 2011/0123749 A1 * | 5/2011 | Hewel et al. ................. 428/36.9 |

FOREIGN PATENT DOCUMENTS

| | | |
|---|---|---|
| CN | 1946552 A | 4/2007 |
| EP | 1 741 553 A1 | 1/2007 |
| EP | 1 860 134 A1 | 11/2007 |
| EP | 2 028 230 A1 | 2/2009 |
| JP | 3 103469 | 4/1991 |

(Continued)

OTHER PUBLICATIONS

Markarian, Jennifer, Impact modifiers: how to make you compound tougher, Plastics, Additives and Compounding, May/Jun. 2004, Elsevier Ltd, p. 46.*
Pionteck, Jurgen. Handbook of Antistatics. Toronto: ChemTec, 2007 (p. 161).*
International Search Report dated Apr. 3, 2012 in PCT/JP12/000162 Filed in Jan. 12, 2012.
Extended European Search Report dated Nov. 27, 2014 in European Patent Application No. 12737183.9.

*Primary Examiner* — Lee S Sanderson
(74) *Attorney, Agent, or Firm* — Oblon, McClelland, Maier & Neustadt, L.L.P.

(57) ABSTRACT

The present invention provides a polyamide resin composition not only having an appropriate melt viscosity despite addition of a conductive filler thereto but also having excellent moldability, conductivity, low-temperature impact resistance, and fuel barrier properties. The present invention is a polyamide resin composition containing specific amounts of a polyamide, a modified resin, and a conductive filler. The polyamide contains: dicarboxylic acid units containing 50 mol % or more of terephthalic acid units and/or naphthalenedicarboxylic acid units; and diamine units containing 60 mol % or more of aliphatic diamine units having 4 to 18 carbon atoms, and has terminal amino groups in an amount of 5 to 60 μmol/g. The modified resin has been modified with an unsaturated compound having a carboxyl group and/or an acid anhydride group. In the polyamide resin composition, a difference between the number of moles ($M_I$) of the terminal amino groups of the polyamide and the number of moles ($M_{II}$) of the carboxyl groups and the acid anhydride groups of the modified resin in 1 g in total of the polyamide and the modified resin is −5.0 μmol or more and less than 4.0 μmol, and the number of moles ($M_{II}$) is more than 4.0 μmol.

16 Claims, No Drawings

(56) References Cited

FOREIGN PATENT DOCUMENTS

| | | | |
|---|---|---|---|
| JP | 10 292106 | | 11/1998 |
| JP | 2001 055458 | | 2/2001 |
| JP | 2002179910 A | * | 6/2002 |
| JP | 2002 275313 | | 9/2002 |
| JP | 2003 55549 | | 2/2003 |
| JP | 2004 099845 | | 4/2004 |
| JP | 2006 124659 | | 5/2006 |
| JP | 2006 152256 | | 6/2006 |
| JP | 2007-169537 A | | 7/2007 |
| JP | 2007-217620 A | | 8/2007 |
| JP | 2008 179753 | | 8/2008 |
| JP | 2010 209247 | | 9/2010 |
| WO | WO 9305097 A1 | * | 3/1993 ............. C08G 69/46 |
| WO | 2004 016693 | | 2/2004 |

* cited by examiner

RESIN COMPOSITION AND MOLDED ARTICLE CONTAINING THE SAME

CROSS REFERENCE TO RELATED APPLICATION

This application is a 371 of PCT/JP2012/000162, filed on Jan. 12, 2012, and claims priority to Japanese Application No. 2011-007307, filed on Jan. 17, 2011 and to Japanese Application No. 2011-125742, filed on Jun. 3, 2011.

TECHNICAL FIELD

The present invention relates to a conductive polyamide resin composition having excellent electrical conductivity, low-temperature impact resistance, fuel barrier properties and moldability, and to a molded article containing the polyamide resin composition.

BACKGROUND ART

Resins are generally electrically insulating materials, but they are often required to be electrically conductive for use as materials for electrical and electronic components, automotive components, etc. The automotive components are, for example, fuel tubes and fuel tanks. Since these components are electrostatically charged by friction generated by passage of a fuel therethrough, they must be electrically conductive to remove this electrostatic charge.

In recent years, automotive components such as fuel tubes and fuel tanks have been required to have high heat resistance, high impact resistance (in particular, at low temperatures), high fuel barrier properties, and good moldability, in addition to conductivity.

The most common technique for imparting conductivity to resins is to add a conductive filler such as carbon black to the resins. Since polyamide resins have excellent properties such as heat resistance, they are used for fuel tubes and fuel tanks of automobiles, and it is known that carbon black is added to such polyamide resins to obtain conductive polyamide resins (see, for example, Patent Literature 1).

CITATION LIST

Patent Literature

Patent Literature 1: JP 2008-179753 A

SUMMARY OF INVENTION

Technical Problem

However, the addition of carbon black to polyamide resins may cause a problem of a decrease in the moldability of the polyamide resins due to an increase in the melt viscosity thereof. Hence, it is an object of the present invention to provide a conductive polyamide resin composition not only having an appropriate melt viscosity despite addition of a conductive filler thereto but also having excellent moldability, conductivity, low-temperature impact resistance and fuel barrier properties, and a molded article containing this polyamide resin composition.

Solution to Problem

In order to solve the above-mentioned conventional technical problem, the present inventors have made intensive studies. As a result, the inventors have found that the above problem can be solved by a polyamide resin composition containing: a semi-aromatic polyamide having a specific amount of terminal amino groups; a modified resin that has been modified with an unsaturated compound having a carboxyl group and/or an acid anhydride group; and a conductive filler, in which the number of moles of the terminal amino groups of the polyamide used and the number of moles of the carboxyl groups and the acid anhydride groups of the modified resin used are respectively defined to fall within specific ranges. Thus, they have completed the present invention.

The present invention is a polyamide resin composition containing: a polyamide (A) containing: dicarboxylic acid units containing 50 to 100 mol % of terephthalic acid units and/or naphthalenedicarboxylic acid units; and diamine units containing 60 to 100 mol % of aliphatic diamine units having 4 to 18 carbon atoms, the polyamide (A) having terminal amino groups ($[NH_2]$) in an amount of 5 to 60 µmol/g; a modified resin (B) that has been modified with an unsaturated compound having a carboxyl group and/or an acid anhydride group; and a conductive filler (C). The polyamide resin composition contains 40 to 96.5 parts by mass of the polyamide (A), 3 to 30 parts by mass of the modified resin (B), and 0.5 to 30 parts by mass of the conductive filler (C), with respect to 100 parts by mass in total of the polyamide (A), the modified resin (B) and the conductive filler (C). A difference ($M_I - M_{II}$) between the number of moles ($M_I$) of the terminal amino groups of the polyamide (A) and the number of moles ($M_{II}$) of the carboxyl groups and the acid anhydride groups of the modified resin (B) in 1 g in total of the polyamide (A) and the modified resin (B) is −5.0 µmol or more and less than 4.0 µmol, and the number of moles ($M_{II}$) is more than 4.0 µmol.

The present invention is also a molded article containing the polyamide resin composition.

The present invention is also a fuel tube including a layer containing the polyamide resin composition.

Advantageous Effects of Invention

The present invention can provide a conductive polyamide resin composition not only having an appropriate melt viscosity despite addition of a conductive filler thereto but also having excellent moldability, conductivity, low-temperature impact resistance, and fuel barrier properties. Molded articles containing this conductive polyamide resin composition are useful in various applications, and are suitable, in particular, for fuel tubes.

DESCRIPTION OF EMBODIMENTS

The polyamide resin composition of the present invention contains: a polyamide (A), a modified resin (B), and a conductive filler (C). The polyamide (A) contains: dicarboxylic acid units containing 50 to 100 mol % of terephthalic acid units and/or naphthalenedicarboxylic acid units; and diamine units containing 60 to 100 mol % of aliphatic diamine units having 4 to 18 carbon atoms, and has terminal amino groups ($[NH_2]$) in an amount of 5 to 60 µmol/g. The modified resin (B) has been modified with an unsaturated compound having a carboxyl group and/or an acid anhydride group.

The dicarboxylic acid units constituting the polyamide (A) contains 50 to 100 mol % of terephthalic acid units and/or naphthalenedicarboxylic acid units. When the content of the terephthalic acid units and/or the naphthalenedicarboxylic acid units in the dicarboxylic acid units is less than 50 mol %, the heat resistance and fuel barrier properties of the resulting polyamide resin composition decrease. Preferably, the content of the terephthalic acid units and/or the naphthalenedicarboxylic acid units in the dicarboxylic acid units is in the range of 75 to 100 mol %, and more preferably in the range of 90 to 100 mol %.

The dicarboxylic acid units constituting the polyamide (A) may contain 50 mol % or less of other dicarboxylic acid units besides terephthalic acid units and/or naphthalenedicarboxylic acid units as long as the effects of the present invention are not impaired. Examples of the other dicarboxylic acid units include units derived from: aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, diphenylmethane-4,4'-dicarboxylic acid, diphenylsulfone-4,4'-dicarboxylic acid, and 4,4'-biphenyldicarboxylic acid. The polyamide (A) may contain one or a plurality of these. Preferably, the content of these other dicarboxylic acid units in the dicarboxylic acid units is 25 mol % or less, and more preferably 10 mol % or less. The polyamide (A) may further contain units derived from polyvalent carboxylic acids such as trimellitic acid, trimesic acid and pyromellitic acid as long as the polyamide resin composition can be melt-molded.

The diamine units constituting the polyamide (A) contain 60 to 100 mol % of aliphatic diamine units having 4 to 18 carbon atoms. When the polyamide (A) containing aliphatic diamine units having 4 to 18 carbon atoms in this proportion is used, the resulting polyamide resin composition has excellent toughness, slidability, heat resistance, moldability, low water absorbency, and lightweight properties. Preferably, the content of the aliphatic diamine units having 4 to 18 carbon atoms in the diamine units is in the range of 75 to 100 mol %, and more preferably in the range of 90 to 100 mol %.

Examples of the above-mentioned aliphatic diamine units having 4 to 18 carbon atoms include units derived from: linear aliphatic diamines such as 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, and 1,18-octadecanediamine; and branched aliphatic diamines such as 2-methyl-1,3-propanediamine, 2-methyl-1,4-butanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, and 5-methyl-1,9-nonanediamine. The polyamide (A) may contain one or a plurality of these.

Preferably, the above-mentioned aliphatic diamine units having 4 to 18 carbon atoms are aliphatic diamine units having 6 to 18 carbon atoms. More preferably, the aliphatic diamine units having 4 to 18 carbon atoms are 1,9-nonanediamine units and/or 2-methyl-1,8-octanediamine units because the resulting polyamide resin composition has much better heat resistance, low water absorbency, and chemical resistance. When the diamine units contains both 1,9-nonanediamine units and 2-methyl-1,8-octanediamine units, the molar ratio of the 1,9-nonanediamine units and the 2-methyl-1,8-octanediamine units (1,9-nonanediamine units/2-methyl-1,8-octanediamine units) is preferably in the range of 95/5 to 40/60, and more preferably in the range of 80/20 to 50/50.

The diamine units constituting the polyamide (A) may contain 40 mol % or less of other diamine units besides the aliphatic diamine units having 4 to 18 carbon atoms. Examples of the other diamine units include units derived from: aliphatic diamines such as ethylenediamine, 1,2-propanediamine, and 1,3-propanediamine; alicyclic diamines such as cyclohexanediamine, methylcyclohexanediamine, and isophoronediamine; and aromatic diamines such as p-phenylenediamine, m-phenylenediamine, xylylenediamine, 4,4'-diaminodiphenylmethane, 4,4'-diaminodiphenylsulfone, and 4,4'-diaminodiphenylether. The polyamide (A) may contain one or a plurality of these. Preferably, the content of these other diamine units in the diamine units is 25 mol % or less, and more preferably 10 mol % or less.

The polyamide (A) may contain aminocarboxylic acid units as long as the effects of the present invention are not impaired. Examples of the aminocarboxylic acid units include units derived from 11-aminoundecanoic acid, 12-aminododecanoic acid, etc. The polyamide (A) may contain one or a plurality of aminocarboxylic acid units. Preferably, the content of the aminocarboxylic acid units in the polyamide (A) is 40 mol % or less, more preferably 20 mol % or less, and further preferably 10 mol % or less, with respect to 100 mol % of all the monomer units constituting the polyamide (A).

The polyamide (A) may contain lactam units as long as the effects of the present invention are not impaired. Examples of the lactam units include units derived from caprolactam, laurolactam, etc. The polyamide (A) may contain a plurality of different lactam units. Preferably, the content of the lactam units in the polyamide (A) is 40 mol % or less, more preferably 20 mol % or less, and further preferably 10 mol % or less, with respect to 100 mol % of all the monomer units constituting the polyamide (A).

Preferably, 10% or more of terminal groups of molecular chains of the polyamide (A) are capped with an end-capping agent. More preferably, the ratio of the terminal groups of the molecular chains that are capped with the end-capping agent (end capping ratio) is 20% or more. When the polyamide (A) having an end capping ratio of 10% or more is used, the resulting polyamide resin composition has better physical properties such as melt stability and hot water resistance.

The end-capping agent is not particularly limited as long as it is a monofunctional compound which is reactive with a terminal amino group or a terminal carboxyl group of the polyamide. In view of reactivity and stability of capped ends, monocarboxylic acid or monoamine is preferred, whereas monocarboxylic acid is more preferred in view of ease of handling. In addition, acid anhydrides, monoisocyanates, mono-acid halides, monoesters, monoalcohols, etc. can also be used as an end-capping agent.

The monocarboxylic acids used as the end-capping agent are not limited as long as they are reactive with an amino group. Examples thereof include: aliphatic monocarboxylic acids such as acetic acid, propionic acid, butanoic acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid, and phenylacetic acid; and arbitrary mixtures of these. Particularly, acetic acid, propionic acid, butanoic acid, valeric acid, caproic acid, caprylic acid, lauric acid, tridecanoic acid, myristic acid, palmitic acid, stearic acid, and benzoic acid are preferred from the viewpoints of reactivity, stability of the capped ends, price, and the like.

The monoamines used as the end-capping agent are not particularly limited as long as they are reactive with a carboxyl group. Examples thereof include: aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; and arbitrary mixtures of these. Particularly, butylamine, hexylamine, octylamine, decylamine, stearylamine, cyclohexylamine and aniline are preferred from the viewpoints of reactivity, boiling point, stability of capped ends, price, and the like.

The end capping ratio of the polyamide (A) can be determined from the following equation (1) by measuring the number of terminal carboxyl groups that are present in the polyamide (A), the number of terminal amino groups that are present in the polyamide (A), and the number of terminal groups that are capped with the end-capping agent. In terms of accuracy and simplicity, it is preferable to determine the numbers of the respective terminal groups by $^1$H-NMR on the basis of the integral values of the characteristic signals corresponding respectively to these terminal groups.

$$\text{End capping ratio } (\%) = [(T-S)/T] \times 100 \quad (1)$$

where T denotes the total number of terminal groups of the molecular chains (which is normally equal to twice the number of polyamide molecules) of the polyamide (A), and S denotes the total number of uncapped terminal carboxyl groups and uncapped terminal amino groups.

The polyamide (A) can be produced by an arbitrary method known as a method for producing polyamide. For example, the polyamide (A) can be produced by a method such as a solution polymerization method or an interfacial polymerization method that uses acid chloride and diamine as raw materials, or a melt polymerization method, a solid-phase polymerization method or a melt extrusion polymerization method that uses dicarboxylic acid and diamine as raw materials.

In producing the polyamide (A), for example, phosphoric acid, phosphorous acid, hypophosphorous acid, and salts and esters thereof can be added as a catalyst, in addition to the above-mentioned end-capping agent. Examples of the salts and esters include: salts of phosphoric acid, phosphorous acid and hypophosphorous acid with metal such as potassium, sodium, magnesium, vanadium, calcium, zinc, cobalt, manganese, tin, tungsten, germanium, titanium and antimony; ammonium salts of phosphoric acid, phosphorous acid and hypophosphorous acid; and ethyl ester, isopropyl ester, butyl ester, hexyl ester, isodecyl ester, decyl ester, stearyl ester and phenyl ester of phosphoric acid, phosphorous acid and hypophosphorous acid.

Preferably, the intrinsic viscosity [η] of the polyamide (A) is in the range of 0.6 to 2.0 dl/g, more preferably in the range of 0.7 to 1.9 dl/g, and further preferably in the range of 0.8 to 1.8 dl/g, as measured in concentrated sulfuric acid under the condition of 30° C. When the polyamide (A) having an intrinsic viscosity of less than 0.6 dl/g is used, the mechanical properties of the resulting polyamide resin composition tend to decrease. When the polyamide (A) having an intrinsic viscosity of more than 2.0 dl/g is used, the flowability of the resulting polyamide resin composition tends to decrease, resulting in reduced moldability.

In the polyamide (A), the amount of terminal amino groups ([NH$_2$]) is 5 to 60 μmol/g, preferably in the range of 5 to 50 μmol/g, and more preferably in the range of 5 to 30 μmol/g. When the amount of terminal amino groups ([NH$_2$]) is less than 5 μmol/g, the compatibility between the polyamide and the modified resin (B) is insufficient. When the amount of terminal amino groups is more than 60 μmol/g, the conductivity, long-term heat resistance, and weld strength decrease.

The polyamide (A) having terminal amino groups ([NH$_2$]) in an amount in the above-mentioned range can be produced in the following manner, for example.

First, dicarboxylic acid and diamine, and optionally aminocarboxylic acid, lactam, a catalyst and an end-capping agent are mixed together to produce a nylon salt. In producing the nylon salt, it is preferable to adjust the total number of moles (X) of carboxyl groups and the total number of moles (Y) of amino groups contained in the above reaction materials so as to satisfy the following equation (2):

$$-0.5 \leq [(Y-X)/Y] \times 100 \leq 2.0 \quad (2)$$

because the polyamide (A) having terminal amino groups ([NH$_2$]) in an amount of 5 to 60 μmol/g can be produced more easily. Next, the nylon salt thus produced is heated to a temperature of 200 to 250° C. to form a prepolymer having an intrinsic viscosity [η] of 0.10 to 0.60 dl/g at 30° C. in concentrated sulfuric acid. Then, the prepolymer is polymerized to a higher degree, and thus the polyamide (A) used in the present invention can be obtained. When the intrinsic viscosity [η] of the prepolymer is in the range of 0.10 to 0.60 dl/g, an imbalance in the number of moles of carboxyl groups and amino groups and a decrease in the polymerization rate are small in the step of increasing the degree of polymerization, and thus the resulting polyamide (A) has a narrower molecular weight distribution and has better properties and moldability. In the case where a solid-phase polymerization is used in the step of increasing the degree of polymerization, it is preferable to perform the polymerization under reduced pressure or under a stream of an inert gas. When the polymerization temperature is in the range of 200 to 280° C., the polymerization rate is high, the productivity is excellent, and the coloring and gelation of the polyamide (A) can be effectively suppressed. In the case where a melt extruder is used in the step of increasing the degree of polymerization, it is preferable to perform the polymerization at a temperature of 370° C. or lower. When the polymerization is performed under such conditions, almost no decomposition of the polyamide occurs, resulting in the polyamide (A) that suffers less degradation.

The polyamide (A) having a desired amount of terminal amino groups ([NH$_2$]) can also be obtained by the combined use of a plurality of polyamides having different amounts of terminal amino groups ([NH$_2$]). In this case, even if the polyamide (A) contains a polyamide in which only the amount of terminal amino groups ([NH$_2$]) is outside the range specified in the present invention, it can be used in the present invention as long as the amount of terminal amino groups ([NH$_2$]) in the whole polyamide (A) is in the range specified in the present invention. When a plurality of polyamides are used in combination, they may be premixed together before being melt-kneaded with the modified resin (B) and the conductive filler (C), or they may be used without being premixed.

As used in this description, the amount of terminal amino groups ([$NH_2$]) refers to the amount (unit: μmol) of terminal amino groups contained in 1 g of the polyamide (A), and can be determined by neutralization titration with an indicator.

In the modified resin (B) that has been modified with an unsaturated compound having a carboxyl group and/or an acid anhydride group, examples of the unsaturated compound having a carboxyl group include α,β-unsaturated carboxylic acids such as acrylic acid, methacrylic acid, maleic acid, fumaric acid, and itaconic acid. Examples of the unsaturated compound having an acid anhydride group include dicarboxylic acid anhydrides having an α,β-unsaturated bond, such as maleic anhydride and itaconic anhydride. As the unsaturated compound having a carboxyl group and/or an acid anhydride group, a dicarboxylic acid anhydride having an α,β-unsaturated bond is preferred, and maleic anhydride is more preferred.

Preferably, the content of carboxyl groups and acid anhydride groups in the modified resin (B) is in the range of 25 to 200 μmol/g, and more preferably in the range of 50 to 100 μmol/g. When the content of the above functional groups is less than 25 μmol/g, the effect of improving the impact resistance may be insufficient. On the other hand, when the content exceeds 200 μmol/g, the flowability of the resulting polyamide resin composition decreases, which may cause a decrease in moldability.

Examples of the (unmodified) resin as the base resin of the modified resin (B) that has been modified with an unsaturated compound having a carboxyl group and/or an acid anhydride group used in the present invention include: polyolefin resins such as low density polyethylene, medium density polyethylene, high density polyethylene, polypropylene, ethylene-propylene copolymer, ethylene-butene copolymer, ethylene-propylene-diene copolymer, ethylene-vinyl acetate copolymer, saponified ethylene-vinyl acetate copolymer, ethylene-acrylic acid copolymer, ethylene-methacrylic acid copolymer, ethylene-methyl acrylate copolymer, ethylene-methyl methacrylate copolymer, ethylene-ethyl acrylate copolymer, and polybutadiene; styrenic resins such as styrene-ethylene copolymer, styrene-propylene copolymer, styrene-butene copolymer, and styrene-propylene-diene copolymer; polynitrile resins such as polyacrylonitrile, polymethacrylonitrile, acrylonitrile-styrene copolymer, acrylonitrile-butadiene-styrene copolymer, and methacrylonitrile-butadiene-styrene copolymer; polymethacrylate resins such as poly(methyl methacrylate) and poly(ethyl methacrylate); polyvinyl ester resins such as polyvinyl acetate; polyvinyl chloride resins such as polyvinylidene chloride, polyvinyl chloride, vinyl chloride-vinylidene chloride copolymer, and vinylidene chloride-methyl acrylate copolymer; and fluorine resins such as polyvinylidene fluoride, polyvinyl fluoride, ethylene-tetrafluoroethylene copolymer, polychlorotrifluoroethylene, ethylene-chlorotrifluoroethylene copolymer, tetrafluoroethylene-hexafluoropropylene copolymer, and tetrafluoroethylene-hexafluoropropylene-vinylidene fluoride copolymer. These resins may be used alone, or two or more of these may be used in combination. Preferably, the modified resin (B) that has been modified with an unsaturated compound having a carboxyl group and/or an acid anhydride group is a resin in which at least one selected from the group consisting of a polyolefin resin, a styrenic resin, a polynitrile resin, and a fluorine resin has been modified with an unsaturated compound having a carboxyl group and/or an acid anhydride group, because the resulting molded article has further improved impact resistance, mechanical properties and heat resistance. More preferably, the modified resin (B) is a resin in which at least one selected from the group consisting of low density polyethylene, medium density polyethylene, high density polyethylene, polypropylene, ethylene-propylene copolymer, ethylene-butene copolymer, ethylene-propylene-diene copolymer, acrylonitrile-butadiene-styrene copolymer, polyvinylidene fluoride, and ethylene-tetrafluoroethylene copolymer has been modified with an unsaturated compound having a carboxyl group and/or an acid anhydride group.

As the modification method using an unsaturated compound having a carboxylic group and/or an acid anhydride group, for example, there can be mentioned a method in which an unsaturated compound having a carboxylic group and/or an acid anhydride group is copolymelized during production of the above-mentioned resin by addition polymerization, and a method in which an unsaturated compound having a carboxylic group and/or an acid anhydride group is grafted to the above-mentioned resin by grafting reaction. Preferably, the modified resin (B) is a resin in which the above-mentioned resin has been modified by grafting reaction with an unsaturated compound having a carboxylic group and/or an acid anhydride group.

Examples of the conductive filler (C) used in the present invention include particulate, flaky, and fibrous fillers for imparting conductivity to resins. Examples of the fillers include carbon fiber, conductive carbon black, carbon nanotube, metal fiber, metal powder, metal flakes, metal oxide powder, and metal-coated fiber. Among these fillers, the conductive filler (C) is preferably at least one selected from the group consisting of carbon fiber, conductive carbon black, and carbon nanotube because their specific gravities are low and their conductivity-imparting effect and reinforcing effect are well balanced.

The above-mentioned carbon fiber may be either pitch-based carbon fiber or PAN-based carbon fiber, but PAN-based carbon fiber is preferred because it is superior in terms of elastic modulus and impact resistance. The average fiber length of the carbon fiber in the melt-kneaded mixture is preferably in the range of 10 μm to 10 mm, more preferably in the range of 50 μm to 5 mm, and further preferably in the range of 100 μm to 2 mm, in terms of the retention of good moldability and the improvement of mechanical properties and heat resistance of the resulting molded articles. The aspect ratio of the carbon fiber is preferably in the range of 1 to 3000, and more preferably in the range of 10 to 500.

As the above-mentioned conductive carbon black, commercially available conductive carbon black can be used. Examples of the conductive carbon black include: Ketjen Black EC600JD and EC300J available from Ketjen Black International Company; VULCAN XC-72 and XC-305 available from Cabot; PRINTEX XE2B available from Degussa; #5500 and #4500 available from Tokai Carbon Co., Ltd.; and #5400B available from Mitsubishi Chemical Corporation.

The above-mentioned carbon nanotube may have a single-layer structure or a multi-layer structure. Carbon materials partially having a carbon nanotube structure also can be used. The shape of the carbon nanotube is not limited to a cylindrical shape, and it may be spirally coiled with a pitch of 1 μm or less. The carbon nanotube is commercially available. Examples of the carbon nanotube include BAYTUBES C150P (Bayer Material Science), NANOCYL NC7000 (Nanocyl), VGCF-X (Showa Denko K.K.), and BN fibrils (Hyperion Catalysis International). Carbon nanotubes are also referred to as graphite fibrils or carbon fibrils. The diameter of the carbon nanotube is preferably 0.5 to 100 nm, and more preferably 1 to 30 nm. When the diameter of the carbon nanotube is less than 0.5 nm, the dispersibility tends to decrease, which may cause a decrease in the conductivity. On the other hand, when the diameter is more than 100 nm, the appearance of the resulting molded articles tends to deteriorate, and the conductivity may decrease. Preferably, the aspect ratio of the carbon nanotube is 5 or more. When the aspect ratio is less than 5, the conductivity may decrease.

The polyamide resin composition of the present invention may optionally contain other resins besides the polyamide (A) and the modified resin (B), other fillers besides the conductive filler (C), and other components such as a nucleating agent, a heat or light stabilizer, an antioxidant, a copper-containing stabilizer, a colorant, an antistatic agent, a plasticizer, a lubricant, a flame retardant, and a flame retardant synergist.

Examples of the other resins include: polyolefin resins such as low density polyethylene, medium density polyethylene, high density polyethylene, polypropylene, ethylene-propylene copolymer, ethylene-butene copolymer, ethylene-propylene-diene copolymer, ethylene-vinyl acetate copolymer, saponified ethylene-vinyl acetate copolymer, ethylene-acrylic acid copolymer, ethylene-methacrylic acid copolymer, ethylene-methyl acrylate copolymer, ethylene-methyl methacrylate copolymer, ethylene-ethyl acrylate copolymer, and polybutadiene; polyester resins such as polybutylene terephthalate, polyethylene terephthalate, polyethylene naphthalate, polybutylene naphthalate, polyethylene isophthalate, polyarylate, and liquid crystal polyester; polyether resins such as polyacetal and polyphenylene oxide; polysulfone resins such as polysulfone and polyethersulfone; polythioether resins such as polyphenylene sulfide and polythioether sulfone; polyketone resins such as polyether ether ketone and polyallyl ether ketone; styrenic resins such as styrene-ethylene copolymer, styrene-propylene copolymer, styrene-butene copolymer, and styrene-propylene-diene copolymer; polynitrile resins such as polyacrylonitrile, polymethacrylonitrile, acrylonitrile-styrene copolymer, acrylonitrile-butadiene-styrene copolymer, and methacrylonitrile-butadiene-styrene copolymer; polymethacrylate resins such as poly(methyl methacrylate) and poly(ethyl methacrylate); polyvinyl ester resins such as polyvinyl acetate; polyvinyl chloride resins such as polyvinylidene chloride, polyvinyl chloride, vinyl chloride-vinylidene chloride copolymer, and vinylidene chloride-methyl acrylate copolymer; cellulose resins such as cellulose acetate and cellulose butyrate; fluorine resins such as polyvinylidene fluoride, polyvinyl fluoride, ethylene-tetrafluoroethylene copolymer, polychlorotrifluoroethylene, ethylene-chlorotrifluoroethylene copolymer, tetrafluoroethylene-hexafluoropropylene copolymer, and tetrafluoroethylene-hexafluoropropylene-vinylidene fluoride copolymer; polycarbonate resins; polyimide resins such as thermoplastic polyimide, polyamideimide, and polyetherimide; thermoplastic polyurethane resins; and polyamide resins (except for the polyamide (A)) such as polyamide 6, polyamide 66, polyamide 46, polyamide 6,10, polyamide 6,12, polyamide 11, polyamide 12, poly(meta-xylylene adipamide) (MXD6), poly(pentamethylene terephthalamide), poly[bis(4-aminocyclohexyl)methane dodecamide] (PACM12), and polyamide resins obtained by using one or a plurality of diamines and dicarboxylic acids that are the raw materials of these polyimides.

Examples of the other fillers include: fibrous fillers such as glass fiber; powdery fillers such as calcium carbonate, wollastonite, silica, silica-alumina, alumina, titanium dioxide, potassium titanate, magnesium hydroxide, and molybdenum disulfide; and flaky fillers such as hydrotalcite, glass flakes, mica, clay, montmorillonite, and kaolin.

The nucleating agent is not particularly limited as long as it is commonly used as a nucleating agent for polyamide resins. Examples of the nucleating agent include talk, calcium stearate, aluminum stearate, barium stearate, zinc stearate, antimony oxide, magnesium oxide, and arbitrary mixtures of these. Among these, talc is preferred because it is very effective in increasing the rate of crystallization of polyamide resins. The nucleating agent may be treated with a silane coupling agent, a titanium coupling agent, or the like in order to enhance the compatibility with polyamide resins.

The heat or light stabilizer and the antioxidant are not particularly limited as long as they are commonly used as stabilizers for polyamide resins. Examples of the stabilizer include hindered phenol compounds, hindered amine compounds, phenylenediamine compounds, phenol compounds, benzotriazole compounds, benzophenone compounds, phenyl salicylate compounds, epoxy compounds, phosphite compounds, phosphonite compounds, phosphorus compounds, thio compounds, thioether compounds, tin compounds, and metal halides. Preferably, the stabilizer is a halide (such as a chloride, a bromide or an iodide) of a metal of Group I of the Periodic Table (such as sodium, potassium or lithium), a copper (I) halide (such as copper (I) chloride, copper (I) bromide or copper (I) iodide), or a mixture of a halide of a metal of Group I of the Periodic Table and a copper (I) halide. A copper (I) halide is more preferred.

The plasticizer is not particularly limited as long as it is commonly used as a plasticizer for polyamide resins. Examples of the plasticizer include benzenesulfonic acid alkylamide compounds, toluenesulfonic acid alkylamide compounds, and hydroxybenzoic acid alkyl ester compounds.

The lubricant is not particularly limited as long as it is commonly used as a lubricant for polyamide resins. Examples of the lubricant include higher fatty acid compounds, oxy fatty acid compounds, fatty acid amide compounds, alkylene-bis fatty acid amide compounds, fatty acid-lower alcohol ester compounds, and metal soap compounds. Fatty acid amide compounds, for example, stearic acid amide, palmitic acid amide, methylene bis-stearylamide, and ethylene bis-stearylamide are preferred because they are very effective for external lubrication.

Preferably, the content of these other components in the polyamide resin composition is 50% by mass or less, more preferably 20% by mass or less, and further preferably 5% by mass or less.

The polyamide resin composition of the present invention contains the above-mentioned polyamide (A), the modified resin (B) that has been modified with an unsaturated compound having a carboxyl group and/or an acid anhydride group, the conductive filler (C), and optionally the above-mentioned other components. The contents of the polyamide (A), the modified resin (B), and the conductive filler (C) are 40 to 96.5 parts by mass, 3 to 30 parts by mass, and 0.5 to 30 parts by mass, respectively, with respect to 100 parts by mass in total of the polyamide (A), the modified resin (B) and the conductive filler (C). Preferably, the contents of the polyamide (A), the modified resin (B), and the conductive filler (C) are 60 to 94.5 parts by mass, 5 to 20 parts by mass, and 0.5 to 20 parts by mass, respectively, and more preferably, 65 to 94 parts by mass, 5 to 20 parts by mass, and 1 to 15 parts by mass, respectively.

The polyamide resin composition of the present invention has improved impact resistance and tensile elongation at break because the terminal amino groups of the polyamide (A) react with the carboxyl groups and/or the acid anhydride groups of the modified resin (B) and the interfacial affinity between the phase (A) and the phase (B) increases. However, when the reaction is insufficient, the effect of improving the impact resistance, etc. is not obtained, and when the reaction is excessive, the melt viscosity exceeds the appropriate range. Thus, in the polyamide resin composition of the present invention, the difference ($M_I - M_{II}$) between the number of moles ($M_I$) of the terminal amino groups of the polyamide (A) and the number of moles ($M_{II}$) of the carboxyl groups and the acid anhydride groups of the modified resin (B) in 1 g in total of the polyamide (A) and the modified resin (B) needs to be −5.0 μmol or more and less than 4.0 μmol, and $M_{II}$ needs to be more than 4.0 μmol. When the difference ($M_I - M_{II}$) is outside the above-mentioned range, an increase in the melt viscosity of the polyamide resin composition or an increase in the viscosity of the polyamide resin composition by heat occurs. When $M_{II}$ is 4.0 μmol or less, the impact resistance of the composition decreases. From the viewpoints of keeping the melt viscosity in the appropriate range and improving the impact resistance and moldability, the difference ($M_I - M_{II}$) is preferably −5.0 μmol or more and 2.0 μmol or less, and more preferably, −1.0 μmol or more and 1.0 μmol or less.

The number of moles of the terminal amino groups of the polyamide (A) and the number of moles of the carboxyl groups and the acid anhydride groups of the modified resin (B) in 1 g in total of the polyamide (A) and the modified resin (B) can be calculated using the number of moles of terminal amino groups in 1 g of the polyamide (A) and the number of moles of carboxyl groups and acid anhydride groups in 1 g of the modified resin (B) respectively determined by neutralization titration with an indicator, and the weight ratio between the polyamide (A) and the modified resin (B).

The polyamide resin compound of the present invention can be prepared by mixing the polyamide (A), the modified resin (B), the conductive filler (C), and optionally the above-mentioned other components by a known method, for example, by melt-kneading. Any conventionally known melt-kneading method can be used as the melt-kneading method. For example, a kneading machine such as a single-screw extruder, a twin-screw extruder, a kneader, or a Banbury mixer can be used for the melt-kneading. The type of the machine used for the melt-kneading and the conditions thereof are not particularly limited. For example, the polyamide resin composition of the present invention can be obtained by kneading at temperatures ranging from about 280 to 350° C. for 1 to 30 minutes. In this description, melt-kneading means kneading performed under the conditions in which at least the polyamide (A) melts.

In order to obtain the polyamide resin composition of the present invention by melt-kneading, it is preferable to melt-knead the polyamide (A) and the modified resin (B) in an extruder or the like and side-feed the conductive filler (C) through a midstream or downstream feed port of the extruder or the like because the resulting polyamide resin composition has better mechanical properties.

The following kneading methods can also be preferably used: a method of premixing the polyamide (A), the modified resin (B) and the conductive filler (C), and then feeding the resulting mixture all at once into a co-rotating twin-screw extruder (a) provided with at least one upstream feed port and at least one downstream feed port through the upstream feed port thereof for melt-kneading of the mixture [kneading method A]; a method of premixing a portion or the whole of the molten polyamide (A) and the conductive filler (C) to prepare a master batch, mixing this master batch, the remaining portion of the polyamide (A) and the modified resin (B), and then feeding the resulting mixture into the above co-rotating twin-screw extruder (a) through the upstream feed port thereof for melt-kneading of the mixture [kneading method B]; a method of premixing the polyamide (A) and the conductive filler (C), feeding the resulting mixture into the above co-rotating twin-screw extruder (a) through the upstream feed port thereof for melt-kneading of the mixture, and then feeding the modified resin (B) through the downstream feed port thereof for melt-kneading of the resulting mixture [kneading method C]; a method of premixing a portion or the whole of the molten polyamide (A) and the conductive material to prepare a master batch, mixing this master batch and the remaining portion of the polyamide (A), feeding the resulting mixture into the above co-rotating twin-screw extruder (a) through the upstream feed port thereof for melt-kneading of the mixture, and then feeding the modified resin (B) through the downstream feed port thereof for melt-kneading of the resulting mixture [kneading method D]; and a method of premixing a portion or the whole of the polyamide (A) and the modified resin (B), feeding the resulting mixture into the above co-rotating twin-screw extruder (a) through the upstream feed port thereof for melt-kneading of the mixture, and then feeding the conductive filler (C) and the remaining portion of the polyamide (A) through the downstream feed port thereof for melt-kneading of the resulting mixture [kneading method E].

The polyamide resin composition of the present invention has an appropriate melt viscosity, excellent moldability, and conductivity. In addition, the polyamide resin composition has both excellent toughness such as impact resistance and elongation and excellent mechanical properties such as tensile strength, and further has excellent properties such as fuel barrier properties, heat resistance, low water absorbency, chemical resistance, and long-term heat resistance. Therefore, molded articles containing the polyamide resin composition of the present invention are useful in various applications.

The polyamide resin composition of the present invention can be molded by a molding method, such as injection molding, extrusion molding, press molding, blow molding, calender molding or cast molding, that is commonly used for thermoplastic polymer compositions, according to the type, purpose, shape, etc. of a desired molded article. A combined method of these molding methods can be used as well. Moreover, it also is possible to mold the polyamide resin composition of the present invention with another polymer, etc. by composite molding.

Suitable applications of the molded articles containing the polyamide resin composition of the present invention are fuel system components such as fuel caps, fuel tanks, fuel sender modules, fuel cutoff valves, canisters, and fuel tubes. These fuel system components can be used for various machines equipped with fuel engines such as gasoline engines and diesel engines, for example, automobiles, tractors, cultivators, brush cutters, lawn mowers, and chain saws.

The molded article is suitably used for fuel tubes among these fuel system components in light of properties thereof. The fuel tubes can be used particularly suitably as those for automobiles. Examples of the fuel tubes for automobiles include fuel filler tubes, fuel delivery pipes, fuel filler necks, and quick connectors.

A fuel tube can be obtained, for example, by extrusion-molding into a tube. With respect to a layer structure of the fuel tube, the fuel tube has a single-layer into which the polyamide resin composition of the present invention is molded, or has a multi-layer structure having two or more layers, in which at least one of the layers contains the polyamide resin composition of the present invention. Preferably, the fuel tube has a multi-layer structure having two or more layers, in which the polyamide resin composition of the present invention is used for the innermost layer. In the fuel tube having a multi-layer structure, the layers other than the layer containing the polyamide resin composition of the present invention may be other resin composition layers, a rubber layer, a reinforcing fiber layer, etc.

Specific examples of the materials for the other layers of the fuel tube include: polyester resins such as polybutylene terephthalate, polyethylene terephthalate, polyethylene naphthalate, polybutylene naphthalate, and polyethylene isophthalate; fluorine resins such as ethylene-tetrafluoroethylene copolymer, polychlorotrifluoroethylene, ethylene-chlorotrifluoroethylene copolymer, tetrafluoroethylene-hexafluoropropylene copolymer, and tetrafluoroethylene-hexafluoropropylene-vinylidene fluoride copolymer; polyolefin resins such as polyethylene, polypropylene, and polystyrene; saponified ethylene-vinyl acetate copolymer; polyacetal; polyphenylene sulfide; and polyamide resins such as polyamide 6, polyamide 66, polyamide 46, polyamide 610, polyamide 612, polyamide 11, polyamide 12, polyamide 6T, polyamide 9T, polyamide 10T, polyamide 6T/polyamide 11 copolymer, polyamide 6T/polyamide 12 copolymer, polyamide 6T/polyamide 66 copolymer, polyamide 6T/polyamide 6I copolymer, polyamide 6T/polyamide 6I/polyamide 66 copolymer, hexamethylenediamine/2-methyl-1,5-pentamethylenediamine/terephthalic acid copolymer, poly(methaxylylene adipamide) (MXD6), poly(pentamethylene terephthalamide), and polyamide resins obtained by using one or a plurality of diamines and dicarboxylic acids that are the raw materials of these polyamides.

The molded article containing the polyamide resin composition of the present invention can be used in various applications. Examples thereof include: exterior components for automobiles such as radiator grilles, rear spoilers, wheel covers, wheel caps, cowl vent grilles, air outlet louvers, air scoops, hood bulges, fenders, and back doors; engine room components for automobiles such as cylinder head covers, engine mounts, air intake manifolds, throttle bodies, air intake pipes, radiator tanks, radiator supports, water pump inlets, water pump outlets, thermostat housings, cooling fans, fan shrouds, oil pans, oil filter housings, oil filler caps, oil level gauges, timing belts, timing belt covers, and engine covers; drive system components for automobiles such as shift lever housings and propeller shafts; chassis components for automobiles such as stabilizer bar linkage rods; functional components for automobiles such as window regulators, door locks, door handles, outside door mirror stays, accelerator pedals, pedal modules, seal rings, bearings, bearing retainers, gears, and actuators; electronic components for automobiles such as wire harness connectors, relay blocks, sensor housings, encapsulations, ignition coils, and distributor caps; and electrical and electronic components such as connectors and LED reflectors.

EXAMPLES

The present invention will be specifically described with reference to examples, but the present invention is by no means limited to these examples. The method for evaluating the amount of terminal amino groups ([$NH_2$]) and the content of carboxyl groups and acid anhydride groups, the method for producing molded articles (specimens), and the methods for evaluating the conductivity, impact resistance, melt viscosity and a change in the melt viscosity, and fuel barrier properties are shown below.

(1) Measurement of the Amount of Terminal Amino Groups ([$NH_2$]) of the Polyamide (A) and the Content of Carboxyl Groups and Acid Anhydride Groups of the Modified Resin (B)

1 g of the polyamide (A) was dissolved in 35 mL of phenol, and 2 mL of methanol was added thereto. Thus, a sample solution was obtained. Titration of the sample solution was performed with 0.01 N aqueous HCl and thymol blue as an indicator to determine the amount of terminal amino groups ([$NH_2$], unit: µmol/g). 5 g of the modified resin (B) in the form of pellets was dissolved in 170 mL of toluene, and 30 mL of ethanol was added thereto to obtain a sample solution. Then, neutralization titration of the sample solution was performed with 0.1 N KOH ethanol solution and phenolphthalein as an indicator to determine the content of carboxyl groups and acid anhydride groups of the modified resin (B).

(2) Production of Molded Articles (Specimens)

An injection molding machine (clamping force: 80 tons, screw diameter: φ32 mm) manufactured by TOSHIBA MACHINE Co., Ltd. was used to mold each polyamide resin composition in a mold having a T-shaped runner or a double stacked mold having a T-shaped runner under the conditions of a cylinder temperature of 320° C. and a mold temperature of 150° C. Thus, specimens were produced.

(3) Evaluation of Conductivity

For each of the specimens produced by the above-mentioned method, the surface resistivity was measured at a point in the center of the specimen at an applied voltage of 90 V using a low resistivity meter ("Loresta GP" manufactuared by Mitsubishi Chemical Analytech Co., Ltd.), according to ASTM D257. The surface resistivities of five different specimens were measured, and the conductivity was evaluated using the arithmetic mean thereof as its (average) surface resistivity.

(4) Evaluation of Impact Resistance

For each of the specimens produced by the above-mentioned method, the notched Izod impact value was measured at 23° C. and −40° C. using an Izod impact tester (manufactured by Toyo Seiki Seisaku-sho, Ltd.), according to ASTM D256. Then, the impact resistance was evaluated.

(5) Evaluation of Melt Viscosity

The melt viscosity of each of the polyamide resin compositions was measured under the conditions of a measurement temperature of 310° C., a melting time of 4 minutes, and a shear rate of 122 $s^{-1}$, using Capirograph (manufactured by Toyo Seiki Seisaku-sho, Ltd.).

(6) Evaluation of Change in Melt Viscosity

The MFR values of each of the polyamide resin compositions were measured under the conditions of a measurement temperature of 310° C., a load of 5 kg, and a melting time of 4 minutes and a melting time of 15 minutes, using a melt indexer (manufactured by Toyo Seiki Seisaku-sho, Ltd.), and the MFR values at 15 minutes and 4 minutes were compared. In Tables 3 and 4, the results are shown as positive signs (+) when the MFR values at 15 minutes are larger than those at 4 minutes, and as negative signs (−) when the MFR values at 15 minutes are smaller than those at 4 minutes.

(7) Fuel Barrier Properties

A film with a diameter of 100 mm and a thickness of 150 μm was produced from each of the polyamide resin compositions. The fuel permeation coefficient was measured in an atmosphere at 40° C. and 65 RH %, using a liquid permeation measurement device (manufactured by GTR Tec Corporation). A simulated fuel of isooctane/ethanol/toluene with a volume ratio of 45/10/45 was used as a solvent for measurement.

[Reference Example 1] Production of Semi-Aromatic Polyamide (PA9T-1)

9922.1 g (59.73 moles) of terephthalic acid, 9497.4 g (60.00 moles) of a mixture of 1,9-nonanediamine and 2-methyl-1,8-octanediamine [molar ratio of the former to the latter of 50:50], 67.2 g (0.55 moles) of benzoic acid, 19.5 g of sodium hypophosphite monohydrate (0.1 mass % with respect to the total mass of raw materials), and 5 liters of distilled water were put into an autoclave with an internal volume of 40 liters, and the atmosphere thereof was replaced by nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was reacted while water vapor was discharged gradually and the pressure was maintained at 2 MPa. Next, the pressure was reduced to 1 MPa over 30 minutes, and the reaction was further continued for 1 hour. Thus, a prepolymer having an intrinsic viscosity [η] of 0.16 dl/g was obtained. This prepolymer was dried at 100° C. under reduced pressure for 12 hours, and crushed to the particle size of 2 mm or less. The resultant was subjected to solid-phase polymerization at 230° C. and 13 Pa (0.1 mmHg) for 10 hours. Thus, a white polyamide having a melting point of 265° C., an intrinsic viscosity [η] of 1.60 dl/g, terminal amino groups ([NH$_2$]) in an amount of 3 μmol/g, terminal carbolxyl groups in an amount of 65 μmol/g, and an end capping ratio of 30% was obtained. This polyamide is abbreviated as "PA9T-1".

[Reference Example 2] Production of Semi-Aromatic Polyamide (PA9T-2)

9947.9 g (59.88 moles) of terephthalic acid, 9734.8 g (61.50 moles) of a mixture of 1,9-nonanediamine and 2-methyl-1,8-octanediamine [molar ratio of the former to the latter of 50:50], 29.3 g (0.24 moles) of benzoic acid, 19.7 g of sodium hypophosphite monohydrate (0.1 mass % with respect to the total mass of raw materials), and 5 liters of distilled water were put into an autoclave with an internal volume of 40 liters, and the atmosphere thereof was replaced by nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was reacted while water vapor was discharged gradually and the pressure was maintained at 2 MPa. Next, the pressure was reduced to 1 MPa over 30 minutes, and the reaction was further continued for 1 hour. Thus, a prepolymer having an intrinsic viscosity [η] of 0.14 dl/g was obtained. This prepolymer was dried at 100° C. under reduced pressure for 12 hours, and crushed to the particle size of 2 mm or less. The resultant was subjected to solid-phase polymerization at 230° C. and 13 Pa (0.1 mmHg) for 10 hours. Thus, a white polyamide having a melting point of 256° C., an intrinsic viscosity [η] of 1.60 dl/g, terminal amino groups ([NH$_2$]) in an amount of 80 μmol/g, terminal carbolxyl groups in an amount of 5 μmol/g, and an end capping ratio of 12% was obtained. This polyamide is abbreviated as "PA9T-2".

[Reference Example 3] Production of Semi-Aromatic Polyamide (PA9T-3)

9868.1 g (59.40 moles) of terephthalic acid, 9734.8 g (61.50 moles) of a mixture of 1,9-nonanediamine and 2-methyl-1,8-octanediamine [molar ratio of the former to the latter of 50:50], 146.5 g (1.20 moles) of benzoic acid, 19.7 g of sodium hypophosphite monohydrate (0.1 mass % with respect to the total mass of raw materials), and 5 liters of distilled water were put into an autoclave with an internal volume of 40 liters, and the atmosphere thereof was replaced by nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was reacted while water vapor was discharged gradually and the pressure was maintained at 2 MPa. Next, the pressure was reduced to 1 MPa over 30 minutes, and the reaction was further continued for 1 hour. Thus, a prepolymer having an intrinsic viscosity [η] of 0.14 dl/g was obtained. This prepolymer was dried at 100° C. under reduced pressure for 12 hours, and crushed to the particle size of 2 mm or less. The resultant was subjected to solid-phase polymerization at 230° C. and 13 Pa (0.1 mmHg) for 10 hours. Thus, a white polyamide having a melting point of 265° C., an intrinsic viscosity [η] of 1.20 dl/g, terminal amino groups ([NH$_2$]) in an amount of 80 μmol/g, terminal carbolxyl groups in an amount of 5 μmol/g, and an end capping ratio of 42% was obtained. This polyamide is abbreviated as "PA9T-3".

[Reference Example 4] Production of Semi-Aromatic Polyamide (PAST-4)

9843.2 g (59.25 moles) of terephthalic acid, 9497.4 g (60.00 moles) of a mixture of 1,9-nonanediamine and 2-methyl-1,8-octanediamine [molar ratio of the former to the latter of 50:50], 183.2 g (1.50 moles) of benzoic acid, 19.5 g of sodium hypophosphite monohydrate (0.1 mass % with respect to the total mass of raw materials), and 5 liters of distilled water were put into an autoclave with an internal volume of 40 liters, and the atmosphere thereof was replaced by nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was reacted while water vapor was discharged gradually and the pressure was maintained at 2 MPa. Next, the pressure was reduced to 1 MPa over 30 minutes, and the reaction was further continued for 1 hour. Thus, a prepolymer having an intrinsic viscosity [η] of 0.16 dug was obtained. This prepolymer was dried at 100° C. under reduced pressure for 12 hours, and crushed to the particle size of 2 mm or less. The resultant was subjected to solid-phase polymerization at 230° C. and 13 Pa (0.1 mmHg) for 10 hours. Thus, a white polyamide having a melting point of 256° C., an intrinsic viscosity [η] of 1.20 dug, terminal amino groups ([NH$_2$]) in an amount of 3 μmol/g, terminal carbolxyl groups in an amount of 65 μmol/g, and an end capping ratio of 54% was obtained. This polyamide is abbreviated as "PA9T-4".

[Reference Example 5] Production of Semi-Aromatic Polyamide (PA9T-5)

9870.6 g (59.42 moles) of terephthalic acid, 9497.4 g (60.00 moles) of a mixture of 1,9-nonanediamine and 2-methyl-1,8-octanediamine [molar ratio of the former to the latter of 50:50], 142.9 g (1.17 moles) of benzoic acid, 19.5 g of sodium hypophosphite monohydrate (0.1 mass % with respect to the total mass of raw materials), and 5 liters of distilled water were put into an autoclave with an internal volume of 40 liters, and the atmosphere thereof was replaced by nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was reacted while water vapor was discharged gradually and the pressure was maintained at 2 MPa. Next, the pressure was reduced to 1 MPa over 30 minutes, and the reaction was further continued for 1 hour. Thus, a prepolymer having an intrinsic viscosity [η] of 0.16 dl/g was obtained. This prepolymer was dried at 100° C. under reduced pressure for 12 hours, and crushed to the particle size of 2 mm or less. The resultant was subjected to solid-phase polymerization at 230° C. and 13 Pa (0.1 mmHg) for 10 hours. Thus, a white polyamide having a melting point of 265° C., an intrinsic viscosity [η] of 1.30 dl/g, terminal amino groups ([NH$_2$]) in an amount of 10 μmol/g, terminal carbolxyl groups in an amount of 60 μmol/g, and an end capping ratio of 46% was obtained. This polyamide is abbreviated as "PA9T-5".

[Reference Example 6] Production of Semi-Aromatic Polyamide (PA6T)

9883.1 g (59.49 moles) of terephthalic acid, 6972.6 g (60.00 moles) of a mixture of 1,6-hexanediamine and 2-methyl-1,5-pentanediamine [molar ratio of the former to the latter of 50:50], 124.6 g (1.02 moles) of benzoic acid, 17.0 g of sodium hypophosphite monohydrate (0.1 mass % with respect to the total mass of raw materials), and 5 liters of distilled water were put into an autoclave with an internal volume of 40 liters, and the atmosphere thereof was replaced by nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was reacted while water vapor was discharged gradually and the pressure was maintained at 2 MPa. Next, the pressure was reduced to 1 MPa over 30 minutes, and the reaction was further continued for 1 hour. Thus, a prepolymer having an intrinsic viscosity [α] of 0.16 dl/g was obtained. This prepolymer was dried at 100° C. under reduced pressure for 12 hours, and crushed to the particle size of 2 mm or less. The resultant was subjected to solid-phase polymerization at 230° C. and 13 Pa (0.1 mmHg) for 10 hours. Thus, a white polyamide having a melting point of 315° C., an intrinsic viscosity [η] of 1.30 dl/g, terminal amino groups ([NH$_2$]) in an amount of 10 μmol/g, terminal carbolxyl groups in an amount of 59 μmol/g, and an end capping ratio of 47% was obtained. This polyamide is abbreviated as "PA6T".

[Reference Example 7] Production of Semi-Aromatic Polyamide (PA10T)

9861.5 g (59.36 moles) of terephthalic acid, 10339.2 g (60.00 moles) of 1,10-decanediamine, 156.3 g (1.28 moles) of benzoic acid, 20.4 g of sodium hypophosphite monohydrate (0.1 mass % with respect to the total mass of raw materials), and 5 liters of distilled water were put into an autoclave with an internal volume of 40 liters, and the atmosphere thereof was replaced by nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was reacted while water vapor was discharged gradually and the pressure was maintained at 2 MPa. Next, the pressure was reduced to 1 MPa over 30 minutes, and the reaction was further continued for 1 hour. Thus, a prepolymer having an intrinsic viscosity [η] of 0.16 dl/g was obtained. This prepolymer was dried at 100° C. under reduced pressure for 12 hours, and crushed to the particle size of 2 mm or less. The resultant was subjected to solid-phase polymerization at 230° C. and 13 Pa (0.1 mmHg) for 10 hours. Thus, a white polyamide having a melting point of 318° C., an intrinsic viscosity [η] of 1.30 dl/g, terminal amino groups ([NH$_2$]) in an amount of 10 μmol/g, terminal carbolxyl groups in an amount of 58 μmol/g, and an end capping ratio of 48% was obtained. This polyamide is abbreviated as "PA10T".

[Reference Example 8] Production of Semi-Aromatic Polyamide (PA9N)

12823.3 g (59.32 moles) of 2,6-naphthalenedicarboxylic acid, 9497.4 g (60.00 moles) of a mixture of 1,9-nonanediamine and 2-methyl-1,8-octanediamine [molar ratio of the former to the latter of 50:50], 167.3 g (1.37 moles) of benzoic acid, 22.5 g of sodium hypophosphite monohydrate (0.1 mass % with respect to the total mass of raw materials), and 5 liters of distilled water were put into an autoclave with an internal volume of 40 liters, and the atmosphere thereof was replaced by nitrogen. The mixture was stirred at 100° C. for 30 minutes, and the temperature inside the autoclave was raised to 220° C. over 2 hours. At this time, the pressure inside the autoclave was increased to 2 MPa. In this state, the reaction was continued for 2 hours, and then the temperature was raised to 230° C. Thereafter, the temperature was maintained at 230° C. for 2 hours, and the mixture was reacted while water vapor was discharged gradually and the pressure was maintained at 2 MPa. Next, the pressure was reduced to 1 MPa over 30 minutes, and the reaction was further continued for 1 hour. Thus, a prepolymer having an intrinsic viscosity [q] of 0.16 dl/g was obtained. This prepolymer was dried at 100° C. under reduced pressure for 12 hours, and crushed to the particle size of 2 mm or less. The resultant was subjected to solid-phase polymerization at 230° C. and 13 Pa (0.1 mmHg) for 10 hours. Thus, a white polyamide having a melting point of 275° C., an intrinsic viscosity [η] of 1.30 dl/g, terminal amino groups ([NH$_2$]) in an amount of 10 μmol/g, terminal carbolxyl groups in an amount of 58 μmol/g, and an end capping ratio of 46% was obtained. This polyamide is abbreviated as "PA9N".

In Examples and Comparative Examples below, the following polyamides (A), modified resins (B) and conductive fillers (C) were used.

Polyamides (A)

PA9T-1 to PA9T-5, PA6T, PA10T, and PA9N produced in Reference Examples 1 to 8 mentioned above were used as they were, or mixtures thereof in proportions shown in Table 1 below were used.

Modified Resins (B)

EBR-1: maleic anhydride-modified ethylene-butene copolymer ("TAFMER MH7020" manufactured by Mitsui Chemicals, Inc., acid anhydride group content: 100 μmol/g)

EBR-2: maleic anhydride-modified ethylene-butene copolymer ("TAFMER MH7010" manufactured by Mitsui Chemicals, Inc., acid anhydride group content: 50 μmol/g)

EBR-3: maleic anhydride-modified ethylene-butene copolymer ("TAFMER MH7007" manufactured by Mitsui Chemicals, Inc., acid anhydride group content: 25 μmol/g)

EBR-4: maleic anhydride-modified ethylene-butene copolymer ("TAFMER MH5010" manufactured by Mitsui Chemicals, Inc., acid anhydride group content: 50 μmol/g)

Conductive Fillers (C)

CB: carbon black ("KB EC600JD" manufactured by Ketjen Black International Company)

CNT: carbon nanotube ("VGCF-X" manufactured by Showa Denko K.K., with a diameter of 10 to 15 nm, a fiber length of 3 μm, and an aspect ratio of 200 to 300)

Examples 1 to 12 and Comparative Examples 1 to 9

The polyamide (A), the modified resin (B) and the conductive filler (C) were melt-kneaded under the condition of a cylinder temperature of 320 to 340° C. by a method (collective top-feeding method) in which they were premixed in proportions shown in Table 1 or 2 below and the resulting mixture was fed all at once into a twin-screw extruder ("BTN-32" manufactured by Research Laboratory of Plastics Technology Co., Ltd.) through the upstream feed port thereof, or by a method (elastomer side-feeding method) in which the polyamide (A) and the conductive filler (C) were premixed and the resulting mixture was fed into the twin-screw extruder through the upstream feed port thereof for melt-kneading and then the modified resin (B) was fed through the downstream feed port. Then, the resulting mixture was extruded, cooled, and cut into pellets. Thus, a polyamide resin composition in the form of pellets was produced. The polyamide resin compositions thus obtained were evaluated for various physical properties. Tables 3 and 4 below show the results.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| [Raw materials of polyamide composition] | | | | | | | | | | | | |
| Polyamide (mass %) | | | | | | | | | | | | |
| PA9T-1 | 76.5 | 85 | 76.5 | | 79.2 | | | | | | | |
| PA9T-2 | 8.5 | | 8.5 | | 8.8 | | | | | | | |
| PA9T-3 | | | | 8.5 | | | | | | | | |
| PA9T-4 | | | | 76.5 | | | | | | | | |
| PA9T-5 | | | | | | 85 | 85 | 85 | 85 | | | |
| PA6T | | | | | | | | | | 85 | | |
| PA10T | | | | | | | | | | | 85 | |
| PA9N | | | | | | | | | | | | 85 |
| Amount of terminal amino groups (μmol/g) | 10 | 3 | 10 | 10 | 10 | 10 | 10 | 10 | 10 | 10 | 10 | 10 |
| [M$_I$] (μmol/g) | 8.5 | 2.6 | 8.5 | 8.5 | 8.8 | 8.5 | 8.5 | 8.5 | 8.5 | 8.5 | 8.5 | 8.5 |
| Intrinsic viscosity (dl/g) | 1.6 | 1.6 | 1.6 | 1.2 | 1.6 | 1.3 | 1.3 | 1.3 | 1.3 | 1.3 | 1.3 | 1.3 |
| Modified elastomer (mass %) | | | | | | | | | | | | |
| EBR-1 | | | | | | | | | | | | |
| EBR-2 | 15 | 15 | 15 | 15 | 12 | | | | | | | |
| EBR-3 | | | | | | | | | | | | |
| EBR-4 | | | | | | 15 | 15 | 15 | 15 | 15 | 15 | 15 |
| Amount of carboxyl groups/acid anhydride groups (μmol/g) | 50 | 50 | 50 | 50 | 50 | 50 | 50 | 50 | 50 | 50 | 50 | 50 |
| [M$_{II}$] (μmol/g) | 7.5 | 7.5 | 7.5 | 7.5 | 6.0 | 7.5 | 7.5 | 7.5 | 7.5 | 7.5 | 7.5 | 7.5 |
| [M$_I$] − [M$_{II}$] (μmol/g) | 1 | −5 | 1 | 1 | 3 | 1 | 1 | 1 | 1 | 1 | 1 | 1 |
| Conductive filler (mass %) | | | | | | | | | | | | |
| CNT | | | | | | 2 | 3 | 4 | 6 | 2 | 2 | 2 |
| CB | 5 | 6 | 6 | 6 | 6 | | | | | | | |
| Production method | | | | | | | | | | | | |
| Production method 1 (collective top-feeding) | | | ○ | ○ | ○ | ○ | | | | | | |
| Production method 2 (elastomer side feeding) | ○ | ○ | | | | | ○ | ○ | ○ | ○ | ○ | ○ |

TABLE 2

|  | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|
| [Raw materials of polyamide composition] | | | | | | | | | |
| Polyamide (mass %) | | | | | | | | | |
| PA9T-1 | 55.2 | 55.2 | | 76.5 | 76.5 | | | | |
| PA9T-2 | 29.8 | 29.8 | 85 | 8.5 | 8.5 | | | | |
| PA9T-3 | | | | | | 29.8 | 29.8 | 85 | |
| PA9T-4 | | | | | | 55.2 | 55.2 | | |
| PA9T-5 | | | | | | | | | 85 |
| PA6T | | | | | | | | | |
| PA10T | | | | | | | | | |
| PA9N | | | | | | | | | |
| Amount of terminal amino groups (μmol/g) | 30 | 30 | 80 | 10 | 10 | 30 | 30 | 80 | 10 |
| [$M_I$] (μmol/g) | 25.5 | 25.5 | 68.0 | 8.5 | 8.5 | 25.5 | 25.5 | 68.0 | 8.5 |
| Intrinsic viscosity (dl/g) | 1.6 | 1.6 | 1.6 | 1.6 | 1.6 | 1.2 | 1.2 | 1.2 | 1.3 |
| Modified elastomer (mass %) | | | | | | | | | |
| EBR-1 | | | | 15 | | | | | |
| EBR-2 | 15 | 15 | 15 | | | 15 | 15 | 15 | 15 |
| EBR-3 | | | | | 15 | | | | |
| EBR-4 | | | | | | | | | |
| Amount of carboxyl groups/acid anhydride groups (μmol/g) | 50 | 50 | 50 | 100 | 25 | 50 | 50 | 50 | 50 |
| [$M_{II}$] (μmol/g) | 7.5 | 7.5 | 7.5 | 15.0 | 3.8 | 7.5 | 7.5 | 7.5 | 7.5 |
| [$M_I$] − [$M_{II}$] (μmol/g) | 18 | 18 | 61 | −7 | 5 | 18 | 18 | 61 | 1 |
| Conductive filler (mass %) | | | | | | | | | |
| CNT | | | | | | 3 | 6 | 3 | — |
| CB | 5 | 6 | 6 | 6 | 6 | | | | |
| Production method | | | | | | | | | |
| Production method 1 (collective top-feeding) | | ○ | ○ | ○ | ○ | | | | ○ |
| Production method 2 (elastomer side feeding) | ○ | | | | | ○ | ○ | ○ | |

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| [Physical properties of polyamide composition] | | | | | | | | | | | | |
| Surface specific resistance (Ω/sq) | $10^4$ | $10^4$ | $10^4$ | $10^4$ | $10^4$ | $10^4$ | $10^3$ | $10^2$ | $10^1$ | $10^5$ | $10^4$ | $10^4$ |
| Izod impact value (notched) | | | | | | | | | | | | |
| 23° C. (J/m) | 860 | 150 | 190 | 150 | 165 | 1067 | 972 | 872 | 600 | 1136 | 1041 | 954 |
| −40° C. (J/m) | 270 | 95 | 120 | 90 | 95 | 222 | 200 | 195 | 160 | 230 | 208 | 198 |
| Flowability | | | | | | | | | | | | |
| Melt viscosity (Pa·s) | 2800 | 3000 | 3200 | 2500 | 3000 | 1950 | 2195 | 2295 | 2500 | 1870 | 1952 | 1965 |
| Change in melt viscosity (4 minutes → 15 minutes) | − | − | − | − | − | − | − | − | − | − | − | − |
| Fuel barrier properties | | | | | | | | | | | | |
| Permeation coefficient (g·mm/m²·day) | 0.8 | 0.9 | 0.9 | 0.9 | 0.9 | 0.8 | 0.8 | 0.8 | 0.8 | 1.0 | 0.3 | 0.2 |

TABLE 4

|  | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|
| [Physical properties of polyamide composition] | | | | | | | | | |
| Surface specific resistance (Ω/sq) | $10^4$ | $10^4$ | >$10^7$ | $10^4$ | $10^4$ | $10^4$ | $10^1$ | $10^5$ | $10^{16}$ |
| Izod impact value (notched) | | | | | | | | | |
| 23° C. (J/m) | 870 | 200 | 300 | 400 | 140 | 1069 | 660 | 1166 | 1010 |
| −40° C. (J/m) | 280 | 135 | 135 | 140 | 80 | 220 | 176 | 240 | 860 |

TABLE 4-continued

|  | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|
| Flowability | | | | | | | | | |
| Melt viscosity (Pa · s) | 3200 | 3400 | 4500 | 4200 | 2800 | 2415 | 2750 | 2634 | 2200 |
| Change in melt viscosity (4 minutes → 15 minutes) | + | + | + | − | − | + | + | + | − |
| Fuel barrier properties | | | | | | | | | |
| Permeation coefficient (g · mm/m² · day) | 0.8 | 0.9 | 1.2 | 0.9 | 0.9 | 0.9 | 1.2 | 0.9 | 0.4 |

As can be seen from Table 3, the polyamide resin compositions of Examples 1 to 12 that satisfy the requirements specified in the present invention have excellent conductivity, impact resistance, fuel barrier properties and flowability, and have negative values in the change in melt viscosity.

The polyamide resin compositions obtained in Comparative Examples 1 to 3 and 6 to 8 had positive values in the change in melt viscosity because the differences ($M_I$–$M_{II}$) mentioned above were too large.

The polyamide resin composition obtained in Comparative Example 4 had a high melt viscosity because the difference ($M_I$–$M_{II}$) mentioned above was too small.

The polyamide resin composition obtained in Comparative Example 5 had poor impact resistance because the value of $M_{II}$ was small.

The polyamide resin composition obtained in Comparative Example 9 had significantly poor conductivity because it did not contain the conductive filler (C).

INDUSTRIAL APPLICABILITY

Since the polyamide resin composition of the present invention has excellent conductivity, impact resistance, stability in melt viscosity, and moldability, and further has excellent fuel barrier properties, it is useful as a material for various molded articles including fuel tubes.

The invention claimed is:

1. A polyamide resin composition, comprising:
    a polyamide (A) comprising: dicarboxylic acid units comprising 50 to 100 mol % of terephthalic acid units, naphthalenedicarboxylic acid units, or a combination thereof; and diamine units comprising 60 to 100 mol % of aliphatic diamine units having 4 to 18 carbon atoms, the polyamide (A) having terminal amino groups ([NH$_2$]) in an amount of 5 to 60 μmol/g;
    a modified resin (B) that has been modified with an unsaturated compound having at least one of a carboxyl group and an acid anhydride group; and
    a conductive filler (C),
    wherein:
    the polyamide resin composition comprises 40 to 96.5 parts by mass of the polyamide (A), 3 to 30 parts by mass of the modified resin (B), and 0.5 to 30 parts by mass of the conductive filler (C), with respect to 100 parts by mass in total of the polyamide (A), the modified resin (B) and the conductive filler (C);
    a difference ($M_I$–$M_{II}$) between the number of moles ($M_I$) of the terminal amino groups of the polyamide (A) and the number of moles ($M_{II}$) of the carboxyl groups and the acid anhydride groups of the modified resin (B) in 1 g in total of the polyamide (A) and the modified resin (B) is −1.0 μmol or more and 1.0 μmol or less, and the number of moles ($M_{II}$) is more than 4.0 μmol;
    the conductive filler (C) is at least one selected from the group consisting of a conductive carbon black and a carbon nanotube; and
    the polyamide resin composition does not contain a copper-containing stabilizer.

2. The polyamide resin composition according to claim 1, wherein the aliphatic diamine units having 4 to 18 carbon atoms are 1,9-nonanediamine units, 2-methyl-1,8-octanediamine units, or a combination thereof.

3. The polyamide resin composition according to claim 1, wherein the modified resin (B) is a resin in which at least one selected from the group consisting of a polyolefin resin, a styrenic resin, a polynitrile resin, and a fluorine resin having been modified with an unsaturated compound having at least one of a carboxyl group and an acid anhydride group.

4. The polyamide resin composition according to claim 1, wherein the conductive filler (C) comprises a carbon nanotube having a diameter of 0.5 nm to 100 nm and an aspect ratio of 5 or more.

5. The polyamide resin composition according to claim 1, wherein the melt viscosity of the polyamide resin composition is measured at a melting time of 4 minutes and at a melting time of 15 minutes, where the melt viscosity values of the polyamide resin composition was measured under the conditions of a measurement temperature of 310° C., a load of 5 kg, and a melting time of 4 minutes and a melting time of 15 minutes, using a melt indexer manufactured by Toyo Seiki Seisaku-sho, Ltd., and the melt viscosity value at 15 minutes was less than the melt viscosity measured at 4 minutes.

6. The polyamide resin composition according to claim 1, which exhibits a melt viscosity of from 1,870 to 3,200 Pa·s.

7. The polyamide resin composition according to claim 1, wherein polyamide (A) is at least one member selected from the group consisting of:
    a polyamide consisting of monomer units of terephthalic acid; 1,9-nonanediamine and 2-methyl-1,8-octanediamine; and benzoic acid;
    a polyamide consisting of monomer units of terephthalic acid; 1,6-hexanediamine and 2-methyl-1,5-pentanediamine; and benzoic acid;
    a polyamide consisting of monomer units of terephthalic acid; 1,10-decanediamine; and benzoic acid; and
    a polyamide consisting of monomer units of 2,6-naphthalenedicarboxylic acid; 1,9-nonanediamine and 2-methyl-1,8-octanediamine; and benzoic acid.

8. The polyamide resin composition according to claim 1, wherein modified resin (B) is at least one member selected from the group consisting of:
    a maleic anhydride-modified ethylene-butene copolymer having an acid anhydride group content of 100 μmol/g;

a maleic anhydride-modified ethylene-butene copolymer having an acid anhydride group content of 50 µmol/g; and a maleic anhydride-modified ethylene-butene copolymer having an acid anhydride group content of 25 µmol/g.

9. The polyamide resin composition according to claim 1, wherein polyamide (A) has the terminal amino groups ([NH$_2$]) n amount of 5 to 30 µmol/g.

10. The polyamide resin composition according to claim 1, wherein polyimide (A) has the terminal amino groups ([NH$_2$]) in an amount of 20 to 60 µmol/g.

11. The polyamide resin composition according to claim 1, wherein polyamide (A) has the terminal amino groups ([NH$_2$]) in an amount of 25 to 60 µmol/g.

12. The polyamide resin composition according to claim 1, wherein polyamide (A) has the terminal amino groups ([NH$_2$]) in an amount of 30 to 60 µmol/g.

13. The polyamide resin composition according to claim 1, which does not contain a copper-containing compound.

14. The polyamide resin composition according to claim 1, wherein:

the polyamide (A) is at least one member selected from the group consisting of
  i) a polyamide comprising units of terephthalic acid and a 50:50 molar mixture of 1,9-nonanediamine and 2-methyl-1,8-octanediamine,
  ii) a polyamide comprising units of terephthalic acid and a 50:50 molar mixture of 1,9-nonanediamine and 2-methyl-1,5-pentanediamine,
  iii) a polyamide comprising units of terephthalic acid and 1,10-decanediamine, and
  iv) a polyamide comprising units of 2,6-naphthalenedicarboxylic acid and a 50:50 molar mixture of 1,9-nonanediamine and 2-methyl-1,8-octanediamine;

the modified resin (B) is at least one member selected from the group consisting of
  i) a maleic anhydride-modified ethylene-butene copolymer having an acid anhydride group content of 100 µmol/g,
  ii) a maleic anhydride-modified ethylene-butene copolymer having an acid anhydride group content of 50 µmol/g, and
  iii) a maleic anhydride-modified ethylene-butene copolymer having an acid anhydride group content of 25 µmol/g; and the conductive filler (C) is at least one member selected from the group consisting of
  i) carbon black, and
  ii) carbon nanotubes having a diameter of from 10 to 15 nm, a fiber length of 3 µm, and an aspect ratio of from 200 to 300.

15. A molded article, comprising the polyamide resin composition according to claim 1.

16. A fuel tube, comprising a layer containing the polyamide resin composition according to claim 1.

* * * * *